July 26, 1949.  R. H. RANGER  2,477,007
AEREO-STEREO DEVICE
Filed Aug. 16, 1944  2 Sheets-Sheet 1
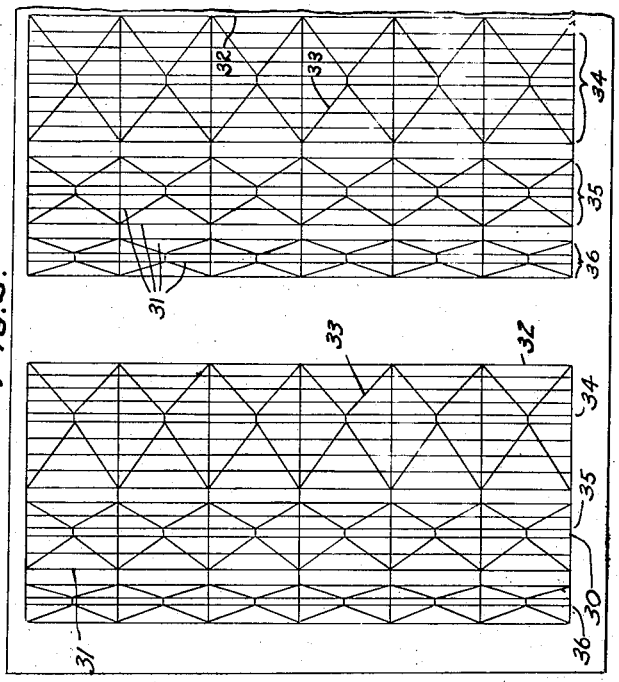
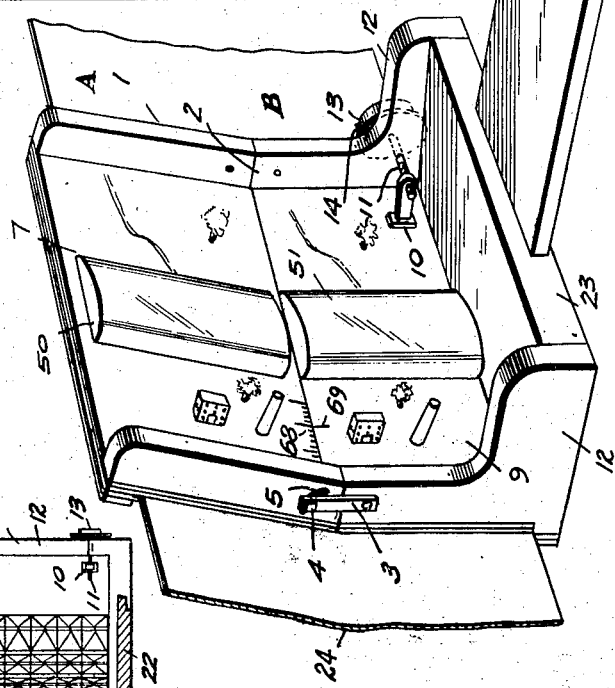
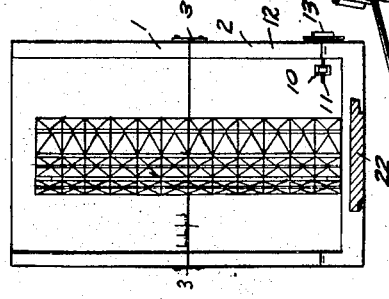
INVENTOR
RICHARD H. RANGER
BY William D. Hall
ATTORNEY July 26, 1949.   R. H. RANGER   2,477,007
AEREO-STEREO DEVICE
Filed Aug. 16, 1944   2 Sheets-Sheet 2
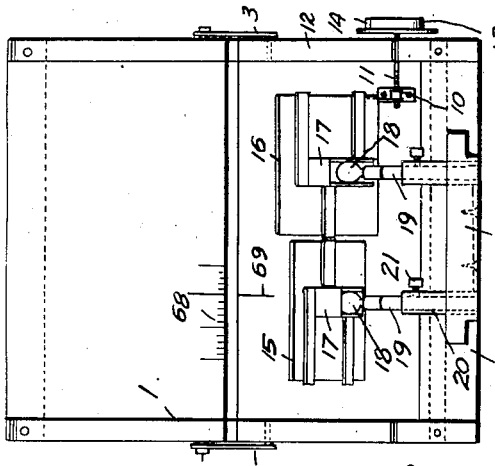
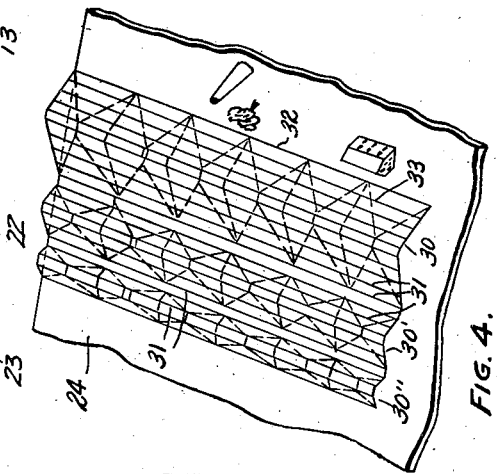
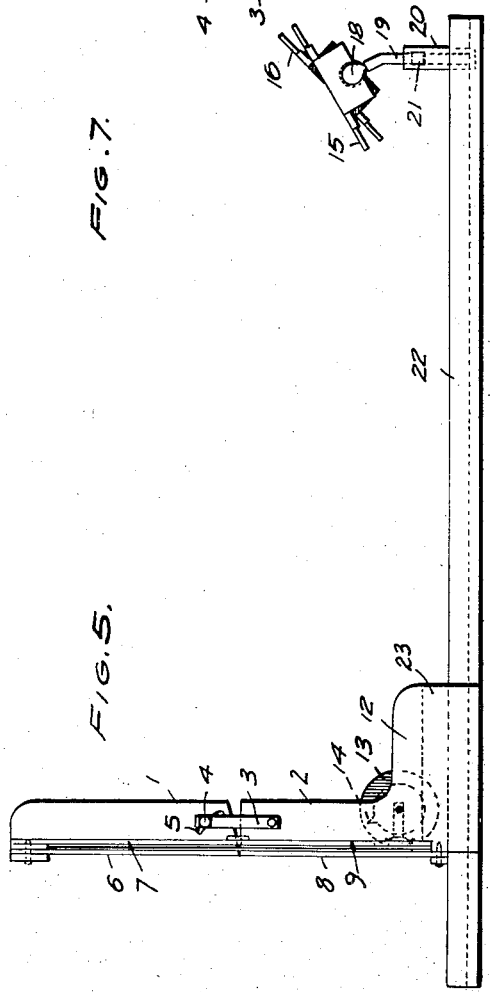
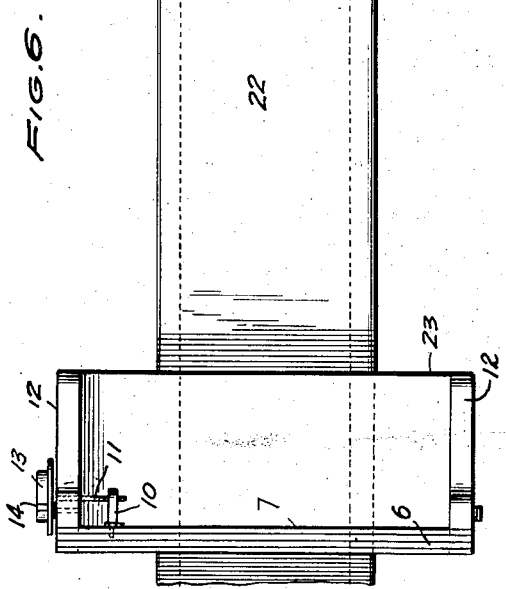
INVENTOR
RICHARD H. RANGER
BY William D. Hall
ATTORNEY Patented July 26, 1949

2,477,007

UNITED STATES PATENT OFFICE 2,477,007

AEREO-STEREO DEVICE

Richard H. Ranger, Newark, N. J.

Application August 16, 1944, Serial No. 549,721

6 Claims. (Cl. 88—29)

(Granted under the act of March 3, 1883, as amended April 30, 1928; 370 O. G. 757)

The invention described herein may be manufactured and used by or for the Government for governmental purposes, without the payment of any royalty thereon.

This invention relates to improvements in stereoscopic devices for determining the height of objects shown on aerial photographs.

It is a practice in photogrammetry to make aerial photographs with a stereo-camera pointed downward at such angle that an accentuated and readily measurable element of elevation appears in the linear distance between the base of an object and its top in the resulting photograph, and to use a scale device to measure this difference on the photograph and thereby determine the actual height of the object. In this procedure, the plane is required to fly at a given height when the picture is taken, so that the ratio between heights on the print and actual heights of the terrain and objects thereon will be as required.

If a continuous strip photograph is made by one of the modern cameras, so operative, and particularly stereoscopic cameras producing continuous exposures through separate lenses on respective sides of a single film strip; and if the camera is pointed forwardly, and slightly to one side of the plane, two continuous pictures side by side will be obtained, substantially as shown in Figure 1 of the drawings herein.

In the last mentioned type of camera, owing to the fact that the film is moved longitudinally in the camera at the same rate and direction that the projected image moves in the camera by reason of progress of the plane, the movement of the plane must be controlled so as to maintain a required speed, as well as its height maintained in coordination with the predetermined scale of measurements of linear distances on the print. These cameras and practices are well understood in the art, and need not be described in detail.

It is therefore an object of this invention to provide a device for producing a stereoscopic illusion by means of which the heights of objects appearing in aerial photographs can be quickly ascertained, and to enable rapid mechanical graphic integration thereof while the film is being viewed in a stereoscopic viewer. At the same time it is sought to present means whereby the person viewing the film will be given an instant appreciation of the actual height measurements of objects seen in the stereoscopic image independently of the mechanical measuring device or other scale devices.

These and other objects are attained by the novel method and construction hereinafter described and illustrated by the accompanying drawings, forming a part hereof, and in which:

Figure 1 is a perspective view of a stereoscopic device embodying the invention.

Figure 2 is a front elevational view of a section of the device.

Figure 3 is a view of grid screens used in connection with the device.

Figure 4 is a perspective view illustrating the stereoscopic illusion produced by the device.

Figure 5 is a side elevational view of the device, the angular difference in the planes of the mirrors being exaggerated for the purpose of illustration.

Figure 6 is a plan view of the device.

Figure 7 is a front elevational view of the device.

Referring to the drawings, the viewing device for producing stereoscopic illusions is shown to comprise an elongated flat bed plate 22, at the left end of which there is mounted an upper guide frame section 1 hingedly connected to a lower vertical guide section 2 erected on the bed 22. Attached to side frame pieces 12 of the lower section 2 there is a bar link 3 through which passes a clamping bolt 4, movable in an arcuate slot 5 in section 1 and having a clamp nut thereon to hold the section 1 in adjusted angular positions relative to the lower section 2. The section 1 is generally disposed in a plane at a very acute angle to the plane of the section 2, these planes meeting at a right horizontal line, as may be seen in Fig. 1. The section 2 may be slidably adjustable on the bed 22.

Forming a part of the upper section are two sheets of transparent structural material 6 and 7 or other transparent material at the rear and at the front respectively of the guide frame, spaced apart to receive the upper part of a picture sheet, which may be a band of photographic film or print 24 between them. Similarly, the lower section 2 has two spaced apart rear and front sheets of similar transparent material 8 and 9, to receive the lower portion of the same film positioned between sheets 6 and 7. The sheet 9 is slidable laterally on the base 23, and has fixed to the lower portion thereof a lug 10, provided with a threaded aperture receiving a threaded bolt 11, passing through side member 12 of section 2, and having attached thereto a knob 13, having a pointed projection 14 on the periphery thereof (Figures 1, 5, 6).

Images from film in the two sections are received in inclined mirrors 15 and 16, which have substantially the same structure, mounted at the right hand end of the elongated bed plate 22. Fixed to the underside of each mirror is a block 17 which receives a ball 18 to provide a ball and socket connection. The ball 18 is attached to an upstanding rod 19 slidable in a tube 20 set in the bed 22, the rod being held in adjusted positions by means of a set screw 21.

As indicated above, the film or print 24 from the aerial camera is about 9½ inches in width, and on a single film there will appear an upper picture A of terrain and a lower picture B of terrain, each of about 4¾ inches wide. However, due to the arrangement of the lenses of the camera the point of view of the lower picture is slightly offset from the point of view of the upper picture. This film is inserted in the device between the sheets of transparent material, with the upper picture between sheets 6 and 7, and the lower picture between sheets 8 and 9. The upper guide section 1 is inclined slightly from the vertical toward the mirrors 15 and 16 which, for the particular picture strip indicated, are positioned about 15 inches from the guide sections, and the two mirrors are adjusted on their ball supports so that one mirror will include a bundle of rays encompassing the image of the upper picture reflected to a point above, and the other mirror will similarly include the image of the lower picture reflected to a second point above, spaced from the first point to match the interpupillary distance of the eyes of the observer.

In Figure 3 are shown diagrams of grids used in connection with the device. One of these is marked on sheet 7 and another on sheet 9. The grids comprise a plurality of parallel lines 31 crossed by a plurality of diagonal lines 33 as shown, the parallel lines representing heights, and the diagonal lines being for the purpose of facilitating the viewing and functioning of the parallel lines.

In operation, the film carrying the upper and lower pictures to be viewed is inserted between the transparent plates of sections 1 and 2, and the grid on the lower section is made to stereoscopically fuse with the grid of the upper section by turning the knob 13 to move sheet 9 laterally. When the pictures and grids are now viewed in the mirrors, each two like groups of the lines of the grids will appear to be a three dimensional figure above the picture and form the appearance of jelly-like parallel three-dimensional ridges 30, 30' and 30'' of different heights and widths as indicated in Figure 4 with lines 31 indicating heights. The outside lines 32 of the grid image appear to rest on the ground. The pitch of the threads on the screw 11 is such that each turn of the screw will move the lower grid a given unit of distance as indicated by the index 69 on the scale 68 in Fig. 1. If the unit chosen be 50 feet, then each revolution of the knob represents 50 feet of height.

Now, to determine the height of any object on the picture, the film is moved until the object concerned has its base on one of the lines 31, say, the right hand line 32. The knob 13 is then rotated until line 32 appears at the top of the object, the number of revolutions of knob 13 being noted. If 1½ revolutions were necessary to so position line 32, the height of the object would be 75 feet.

It is quite easy to adjust the two images in the mirrors to overlap, by tilting the mirrors so that when the eyes of the user are moved back and forth over the mirrors the image does not jump around appreciably.

Inasmuch as the grids and the photographs are in virtual contact with each other, it is possible to magnify these combined images as much as is desired. To this end, lenses have been placed in front of the photographs and practically any amount of magnification can be used and a corresponding increase in the accuracy of height determination can be accomplished.

Semi-cylindrical plano-convex lenses, 50 and 51 (see Figure 1), are preferred, as this type of lens enables a broad sweep to be viewed. The lenses are mounted on a frame so that they can be moved laterally simultaneously. The lenses are mounted on the front sides of the sheets 7 and 9, and the diagrams (see Figure 4) are drawn on the back sides of the front transparent sheets, so that the diagrams lie close against the pictures. One of the front transparent sheets is provided with a scale 68 and the abutting sheet of the other guide section is provided with a pointer 69 to indicate the extent of lateral movement of one sheet relative to the other.

It will be seen in Figure 3 that the grid work of each screen includes three groups 34, 35, 36 (from right to left) of the parallel lines 31, distinguished by means of diagonal lines 33 extending across each group, so that each group forms a narrow net extending entirely across the underlying print. In consequence also, the stereoscopically fused image of the two grids will extend entirely across the stereoscopic image of terrain derived by viewing of the prints. Each group or net is successively smaller in the order named from right to left so that a wide V-shaped ridge 30 is simulated at the right, one 30' of less width and altitude appears next, and a narrow ridge 30'' of the least altitude appears at the left of the screenwork.

As a result, when the film strip is moved progressively through the guides while being stereoptically viewed through the lenses and grids, as specific objects in the picture pass under the net groups 34, 35, 36, or in reverse order, a rapid suggestion of the actual height of the objects will be conveyed to the observer, accordingly as the objects noted seem to lie below or above the apex of each ridge as the object passes thereunder. If the lines 31 have a unit spacing with a scale measurement value of a unit of height, as the base of each object reaches the base line 31 of the ridge after entering under one of the nets or grid groups 34, 35, 36, its height may be read approximately by the number of such lines 31 included in the principal vertical dimension of the object inspected. Its appearance of height in relation to the high, middle, or low ridges 30, 30', 30'', as it passes them, affords an immediate indication of the closest height represented in the grid groups.

It will be seen that the forms of the grids remove the need for extensive shifting of a picture to bring objects in proper relation to indicia on measuring devices, as well as enabling immediate discernment of approximate measurements, since all objects pass under the groups and lines by the simple sliding of the film in one direction through the device. The magnification by the lenses 50—51 occurs throughout the limited central grid-covered portion of the picture, where the most accurate reading is required.

This description is illustrative and not limitative of the invention, of which modifications can be made without departing from the spirit and scope as set forth in the appended claims. For example, an effective device can be provided by using only one sheet of transparent material on the upper section and only one sheet on the lower section. Also, effective diagrams can be produced using different arrangements of the lines.

The invention having been described, what is claimed is:

1. A stereoscopic device, comprising a lower picture sheet guide, an upper picture sheet guide, said guides meeting at a right line and being oblique to each other in planes at an acute angle to each other and constructed to receive commonly and slidably therethrough along said line a stereoscopic picture sheet, said guides each having front guide sheets of transparent material and rear guide sheets positioned to receive the picture sheet therebetween, similar diagrams of unequally spaced parallel lines on said front guide sheets arranged across the path of sliding movement of the picture sheet and normal to the principal linear height components of objects in the picture on the picture sheet, said parallel lines being spaced to indicate stereoptically a series of parallel ridges and valleys, means for moving one of the front guide sheets laterally relatively to the other front guide sheet, and means to project respective images from the portions of a picture sheet in the two said guides and of the superposed grids, to respective view points spaced an interpupillary distance apart.

2. The structure set forth in claim 1 further characterized by the diagrams having a plurality of rows of diamond shaped figures connecting groups of parallel lines, said groups respectively increased in width from one side to the other of the diagrams.

3. A stereoscopic device, comprising a first picture sheet guide, a second picture sheet guide, said guides being oblique to each other in planes at an acute angle to each other arranged to support respective sides of a picture sheet in said planes and constructed with an opening to receive a stereoscopic picture sheet slidably for movement therethrough with respective parts in said planes, front guide sheets for said picture sheet of transparent material in respective said guides, similar diagrams of unequally spaced parallel lines on said guide sheets spaced and arranged to indicate stereoptically ridges of successively different elevations and valleys across the path of sliding movement of the picture sheet, means for moving one of the front guide sheets laterally relative to the other and means to project images of pictures from respective side portions of a picture sheet in the guides and of the grids stereoptically.

4. In a photo-stereoscopic system for obtaining measurements of specific objects on terrain photographed by aerial photography wherein cooperative calibrating stadia devices are imposed respectively upon pictures being stereoscopically viewed, and measurements obtained by calibrating devices; that improvement which comprises an aerial stereoscopic picture strip having its principal field axes disposed at a substantial angle to the vertical elements shown in the pictures on the strip, a support for the strip constructed to receive the strip slidably through the support, means to enable stereoscopic inspection of pictures displayed therein, said calibrating devices comprising two grids carried by said support positioned to lie superposed upon respective pictures on the strip in said support, each grid having parallel rectilinear lines thereon extending the full dimension of the respective picture transverse to the direction of its said vertical elements in the picture, and variously spaced in groups, the lines in each group being mutually arranged to simulate stereoptically a ridge when viewed with its corresponding group of the other grid, the ridges so simulated being parallel and of progressively increased heights in one direction along the path of movement of the picture strip in said guides.

5. The structure of claim 4 wherein said lines are distinguished in a plurality of groups, of respective different widths, each having a width significant of a respective height when the grids are stereoptically fused over the prints, said grids having lines crossing the said parallel lines of a group in a direction to create the semblance of respective three-dimensional ridges for each of said groups when the grids are stereoscopically fused over a print, each said ridge extending entirely across the stereoscopic image, having its base at the apparent ground level of said image and its apex in space at a respective height between the print and the observer.

6. The structure of claim 4, wherein said lines are distinguished in at least one group having a width related to a respective height when the grids are stereoscopically fused over the prints, said grids having diagonal lines crossing the said parallel lines of each group and extending from each side of the group in a direction to create the semblance of a three-dimensional ridge extending across the print having its base at the apparent ground level and its apex in space between the observer and the prints.

RICHARD H. RANGER.

REFERENCES CITED

The following references are of record in the file of this patent:

UNITED STATES PATENTS

| Number | Name | Date |
|---|---|---|
| 583,703 | Grousilliers | June 1, 1897 |
| 907,973 | Crocker | Dec. 29, 1908 |
| 934,916 | Von Hofe | Sept. 21, 1909 |
| 1,494,728 | Beyerlein | May 20, 1924 |
| 1,743,952 | Barr et al. | Jan. 14, 1930 |
| 1,816,181 | Eliel | July 28, 1931 |
| 1,894,148 | Barr | Jan. 10, 1933 |

FOREIGN PATENTS

| Number | Country | Date |
|---|---|---|
| 164 | Great Britain | 1879 |
| 466,263 | Great Britain | May 25, 1937 |